United States Patent [19]

Crane

[11] Patent Number: 5,731,932
[45] Date of Patent: Mar. 24, 1998

[54] TRANSVERSE PIN MOUNTING OF HEAD/ GIMBAL ASSEMBLIES IN A DISC DRIVE

[75] Inventor: Peter Crane, Richfield, Minn.

[73] Assignee: Seagate Technology, Inc., Scotts Valley, Calif.

[21] Appl. No.: 748,695

[22] Filed: Nov. 13, 1996

Related U.S. Application Data

[60] Provisional application No. 60/021,642, Jul. 12, 1996.

[51] Int. Cl.$^6$ .................................................. G11B 21/16
[52] U.S. Cl. .................................................. 360/104
[58] Field of Search .................................. 360/104, 106

[56] References Cited

U.S. PATENT DOCUMENTS

| | | | |
|---|---|---|---|
| 4,943,875 | 7/1990 | Reidenbach et al. | 360/104 |
| 5,062,018 | 10/1991 | Yaeger | 360/104 |
| 5,296,984 | 3/1994 | Fick | 360/104 |
| 5,313,355 | 5/1994 | Hagen | 360/104 |
| 5,497,282 | 3/1996 | Hoffmann et al. | 360/104 |

*Primary Examiner*—Craig A. Renner
*Attorney, Agent, or Firm*—Edward P. Heller, III; Raghunath S. Minisandram

[57] ABSTRACT

An apparatus for mounting head-supporting flexures in a disc drive includes a transverse hole closely adjacent the distal end of head mounting arms, the transverse hole communicating to the distal surface of the head mounting arm through a transverse slot. Flexures are formed with a substantially semi-cylindrical transverse channel at their proximal mounting ends. A pair of flexures—or a single flexure and a dummy channel blank—are placed in back-to-back relationship such that the transverse channels form a substantially cylindrical transverse opening, and a transverse pin is inserted in the transverse opening. The flexures and pin—or single flexure, dummy channel blank and pin—are then inserted into the transverse hole in the head mounting arm with the flexures extending distally through the transverse slot. The components may be held in their assembled positions by interference fit, or the transverse pin may be deformed after assembly to lock the components in their assembled condition.

24 Claims, 12 Drawing Sheets

2

TRANSVERSE PIN MOUNTING OF HEAD/GIMBAL ASSEMBLIES IN A DISC DRIVE

RELATED APPLICATION

This application claims priority to United States Provisional Application Ser. No. 60/021,642, filed Jul. 12, 1996.

BACKGROUND OF THE INVENTION

1. Field of the Invention

This invention relates generally to the field of disc drive data storage devices and more particularly, but not by way of limitation, to an apparatus for mounting head/gimbal assemblies to actuator arms in disc drives.

2. Brief Description of the Prior Art

Disc drives of the type known as "Winchester" disc drives, or hard disc drives, are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

A typical head suspension includes four integrally formed portions: 1) a mounting portion, for attaching the head suspension to the actuator used to move the heads from track to track; 2) a spring portion, to provide a counterbalancing force to balance the hydrodynamic lifting force of the slider and maintain consistent flying height of the head; 3) a rigid beam portion for transferring the counterbalancing force of the spring portion to the head/slider assembly; and 4) a gimbal portion, to which the head/slider assembly is attached, which is compliant in the head assembly's roll and pitch axes to allow the slider to follow minor variations in the flatness of the discs, and stiff in the head assembly's yaw and in-plane axes to permit accurate positioning of the head.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions described above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

The head suspensions, or flexures, described above are typically fabricated from full hardened 300 series stainless steel foil, with flexures of the current generation being formed of flat stainless steel stock 0.0025 inches thick. A typical flexure which could be modified to implement the present invention is described in detail in U.S. Pat. Nos. 5,428,490 and 5,331,489, both assigned to the assignee of the present invention and incorporated herein by reference as if included herein in their entireties.

As noted in the previously incorporated references, since the flexures are typically formed of relatively weak material, and, since the attachment of the flexures to the actuator assembly must be very strong and rigid, the flexure assemblies typically include mounting plates, contiguous to the mounting portion of the flexure, to stiffen the mounting portion and allow for strong mechanical connection of the head suspension assembly to the actuator assembly. These mounting plates were commonly formed of stainless steel having a thickness of approximately 0.008 inches.

Several different attachment systems have historically been used to connect flexures with mounting plates to actuator arms, including rivets (U.S. Pat. No. 4,783,710, Salyer, et al.), machine screws, adhesives and swaging (U.S. Pat. No. 5,262,911, Eckerd, et at). The two immediately preceding patents are also assigned to the assignee of the present invention and are also incorporated herein by reference. Each of these prior art mounting schemes has its own particular drawbacks, including limitations on interdisc spacing (machine screws), contamination of assembly fixtures (adhesives), additional component costs (screws, swaging) and convenience of rework (rivets, swaging). Furthermore, all of these types of head suspension attachment share a common set of limitations, i.e., the addition of mass to the moving portion of the disc drive.

In typical current generation disc drives, the actuator housing and integral head mounting arms are formed of aluminum or magnesium to minimize the moving mass of the actuator and thus increase the access speed of the disc drive. However, the inclusion of steel mounting plates at the juncture of the head arms and the flexure assemblies adds a significant amount of moving mass at a location approximately midway between the pivot axis of the actuator and the read/write head. This additional moving mass is undesirable for several reasons: firstly, this relatively large mass increases the overall inertia of the entire actuator assembly, limiting the actuator speed for a given amount of applied power; and secondly, the location of this additional mass can result in unacceptable deformation of closely spaced components as a result of applied mechanical shock. Other specific drawbacks and limitations of flexure attachment schemes which incorporate mounting plates will be discussed in detail below.

A need clearly exists, therefore, for a flexure mounting apparatus that overcomes the drawbacks and limitations of prior art attachment schemes, and which will provide simple, consistent and inexpensive assembly of head suspensions to actuator head mounting arms.

SUMMARY OF THE INVENTION

The present invention includes a transverse hole, closely adjacent the distal end of the actuator head mounting arm of the actuator, which opens to the distal surface of the actuator head mounting arm through a transverse slot. A head suspension is formed which includes a transverse, substantially semi-cylindrical channel at its proximal mounting end. A pair of head suspensions, or a single head suspension and a dummy channel blank, are placed in back-to-back relationship and a transverse pin is inserted into the substantially cylindrical channel thus formed, and this combination of components is inserted into the transverse hole in the actuator head mounting arm with the flexures, or single flexure and dummy channel blank, extending distally through the transverse slot. In the presently preferred embodiment, the transverse pin is formed of fully annealed aluminum which is press-formed after insertion in the transverse hole to lock the flexure assemblies to the actuator head mounting arm, and a portion of the transverse pin extends beyond the lateral extent of the actuator head mounting arm after assembly to allow for removal for any needed rework.

It is an object of the invention to provide a flexure mounting apparatus for mounting head-supporting flexure assemblies to the ends of actuator head mounting arms in a disc drive data storage device.

It is another object of the invention to provide a flexure mounting apparatus which reduces the moving mass of the actuator assembly.

It is another object of the invention to provide a flexure mounting apparatus which minimizes vertical height at the attachment point, thus enabling either closer disc spacing or increased shock tolerance.

It is another object of the invention to provide a flexure mounting apparatus which simplifies the fabrication of the flexure assembly.

It is another object of the invention to reduce the cost of fabricating the flexure assembly.

It is another object of the invention to provide a flexure mounting apparatus which contributes to the consistency of the flying height of the heads in the disc drive assembly.

It is yet another object of the invention to provide a flexure mounting apparatus which is simple and inexpensive to implement in high manufacturing volumes.

These and other features and advantages of the present invention can best be understood by a review of the following Detailed Description of the Preferred Embodiment, when read in conjunction with an examination of the accompanying drawings.

DETAILED DESCRIPTION OF THE PREFERRED EMBODIMENT

Figure 1:
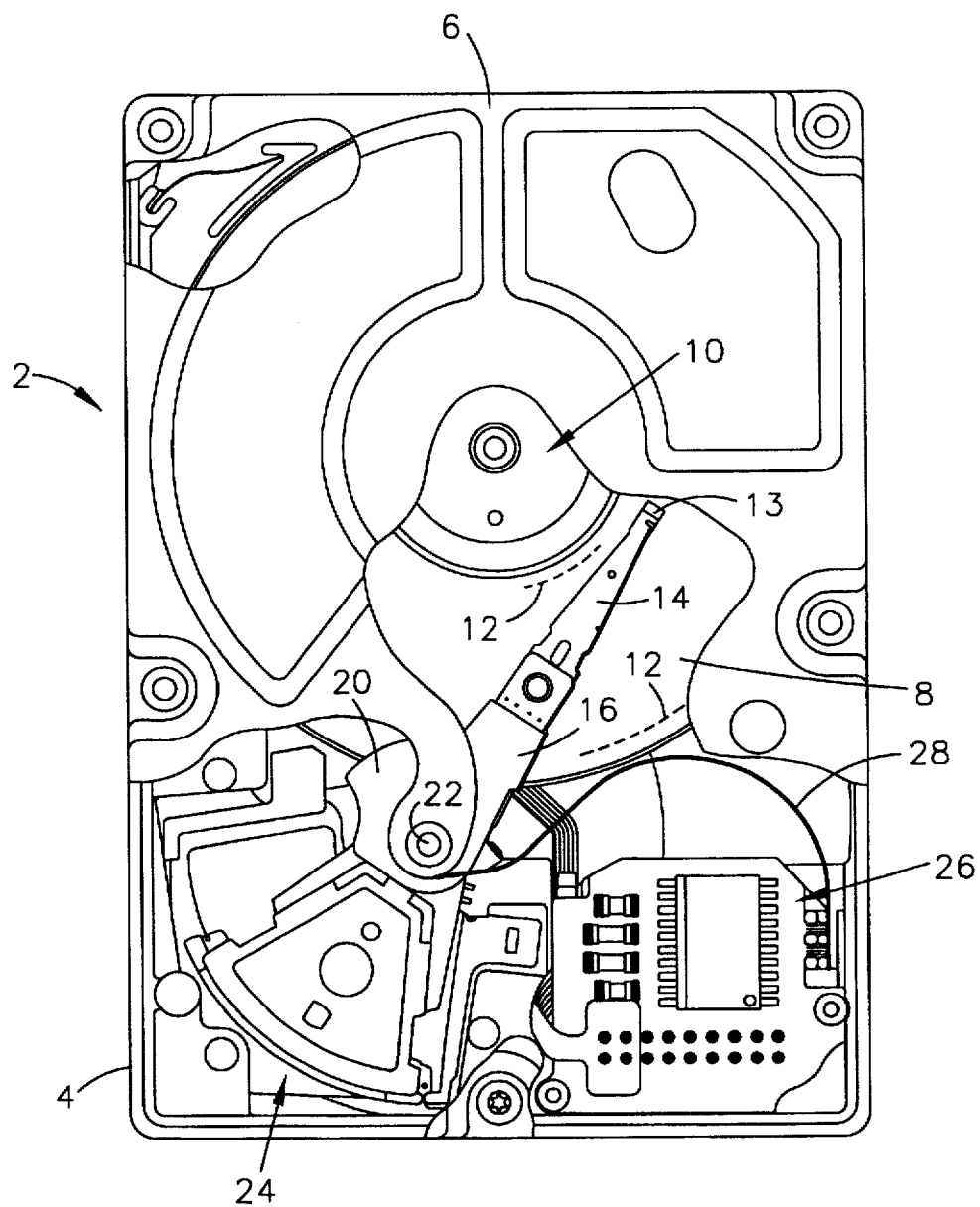
FIG. 1 is a plan view of a disc drive in which the present invention is particularly useful.

Turning now to the drawings and specifically to FIG. 1, shown is a plan view of a disc drive 2 in which the present invention is particularly useful. The disc drive 2 includes a base member 4 to which all other components are directly or indirectly mounted and a top cover 6, shown in partial cutaway, which, together with the base member 4, forms a disc drive housing which encloses delicate internal components and isolates these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown at 12, on which data are recorded via an array of vertically aligned head assemblies (one of which is shown at 13). The head assemblies 13 are supported by head suspensions, or flexures 14, which are attached to actuator head mounting arms 16. The actuator head mounting arms 16 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (some of which is shown at 26 and some of which is mounted to a printed circuit board, (not shown)) to control all aspects of the operation of the disc drive 2 is provided, with control signals to drive the VCM 24, as well as data signals to and from the heads 13 carried between the printed circuit board and the moving actuator assembly via a printed circuit cable (PCC) 28.

From FIG. 1 it will be apparent to one of skill in the art that the amount of mass included in the moving portion of the disc drive actuator will be at least partially determinative of the speed with which the heads 13 can be moved from track to track on the disc surfaces. In particular, given a VCM 24 and control electronics of a particular configuration, the speed of the actuator will be dependent on the mass of the actuator head mounting arms 16, the mass of the flexure/head assemblies 14/13 and the mechanism used to attach the flexure/head assemblies 14/13 to the actuator head mounting arms 16.

It is also well known to those in the industry that, in order to provide maximum storage capacity of the disc drive 2, the vertical spacing between adjacent discs 8 should be minimized in order to include the greatest possible number of discs 8 and heads 13 within an industry-standard packaging envelope. In order to minimize inter-disc spacing, the components which are located between disc surfaces must have minimal vertical height. The vertical axis in FIG. 1, that is the axis proceeding into and out of the page, is sometimes referred to in the industry as the Z-axis of the disc drive 2 to provide an orthogonal reference which is independent of the orientation in which the disc drive 2 is eventually mounted in a computer or storage subsystem. There are, however, limitations on the amount of Z-axis dimensional reduction which can be made.

For instance, certain components are considered standard within the industry. Included in this class of components are the sliders which support the electromagnetic transducers which record and retrieve data. Historically, the size of the slider has tended downward from the original Winchester slider which had a Z-axis height of 0.034 inches to the mini-Winchester slider (Z-height 0.024 inches) to the "50%" slider (Z-height 0.017 inches) to the currently used "30%" slider which has a Z-height of 0.0118 inches. Similarly, the technology of flexures has lead to the current generation of flexures, such as those described in previously incorporated U.S. Pat. Nos. 5,428,490 and 5,331,489, which add substantially only the original thickness of the flexure material to the necessary inter-disc spacing.

A merge clearance is also required to permit assembly of the heads between the discs. Given normal process tolerances on the pitch and roll angles with which the head sliders are mounted on flexure gimbals, the slider corners will approach the disc surfaces during assembly. The flexure springs are therefore elastically overloaded during assembly, by deflecting the sliders away from the disc surfaces, this deflection being hereinafter denoted as the "merge clearance". The merge clearance allows the heads to be swung across the outer perimeters of the discs during assembly, without contact between the corners of the head sliders and the disc surfaces. This swinging motion is commonly accomplished by rotating the actuator bearing housing 20 about its pivot shaft 22, from a point outside the normal range of operation (such that the head sliders are outside the disc perimeters) to a point near the outer data track 12. The heads are then loaded onto the disc surfaces by relaxing the merge clearance after the swinging assembly motion has come to rest. A typical merge clearance in the current generation of disc drives is 0.008 inches.

Thus the minimal interdisc spacing would be determined by the Z-height of the slider, plus the thickness of the flexure material, plus the merge clearance, times two (for cooperation with the lower surface of one disc and the upper surface of the adjacent lower disc), plus an allowance for tolerances of all such components.

Unfortunately, such ideal minimal inter-disc spacing is seldom achieved due to requirements in the market place that disc drives be operable under certain minimal mechanical shock conditions. For instance, it is commonly expected in the laptop computer market that the laptop computer, and thus all internal components such as disc drives, will be capable of withstanding mechanical shocks of over 100 G's without incurring fatal damage. Such mechanical shock requirements typically specify that the laptop computer be able to tolerate these shocks in any of the major orthogonal axes.

It is typical, as can be seen in FIG. 1, that the actuator head mounting arms be significantly wider than they are thick in the Z-axis dimension. As such they are relatively stiff in the X- and Y- axes, which are normal to the Z-axis, but relatively weak, or flexible, in the Z-axis. Thus, if mechanical shock is administered along the Z-axis, the actuator head mounting arms will deflect toward one or the other of the adjacent disc surfaces, and, if the applied shock is of sufficient magnitude, the distal end of the head mounting arm could contact the spinning disc surface, potentially rendering the entire disc drive inoperative. Therefore, the drive design must also include consideration of the amount of deflection induced in the head mounting arms by the maximum specified mechanical shock in the Z-axis, plus tolerance for the same variation. It will be recognized by those of skill in the art that, since the amount of deflection of the head mounting arms due to Z-axis shock is directly proportional to the mass of the head mounting arm 16 and the mass of the connecting mechanism used to mount the head/flexure assembly 14/13 to the head mounting arm 16, it would be desirable to minimize both the overall mass of the head mounting arm 16, as well as the mass of the attachment mechanism.

FIGS. 2A through 2D are simplified diagrammatic sectional elevation views of several prior art mechanisms used to attach head suspensions, or flexures, 14 to the actuator head mounting arms 16.

Figure 2A:
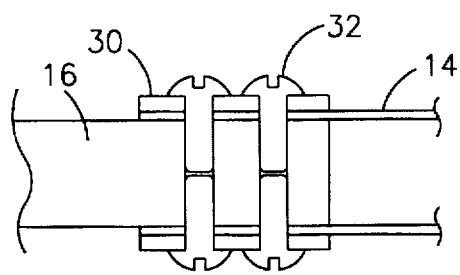
FIGS. 2A through 2D are simplified diagrammatic sectional elevation views of prior art flexure mounting systems.

Turning first to FIG. 2A, shown is a prior art flexure attachment apparatus such as was used in the earliest hard disc drives. In this flexure attachment apparatus, the flexures 14 are spot welded to rigid mounting plates 30, and the flexure/mounting plate subassemblies 14/30 are then attached to the actuator head mounting arm 16 with at least one machine screw 32. If more than one machine screw 32 is used as is shown, the attachment means provides a very robust attachment which does not allow misalignment of the flexure 14 and the actuator head mounting arm even when excessive forces are exerted on the joint, such as when the actuator contacts a limit stop used to prevent excessive motion of the actuator under "runaway" conditions. This type of flexure mounting apparatus does, however, have several drawbacks: 1) the use of machine screws necessitates that the actuator head mounting arm be drilled and tapped, adding to cost; 2) since the flexures must be screwed onto the actuator head mounting arm from both sides, the actuator head mounting arms must be separately fabricated from the actuator bearing housing (20 in FIG. 1 ) and then individually attached, entailing additional assembly steps and component costs; and 3) the heads of the machine screws add vertical height that limits how closely adjacent discs can be positioned. For these reasons, this type of flexure mounting apparatus is seldom used in disc drives of the current generation.

Figure 2B:
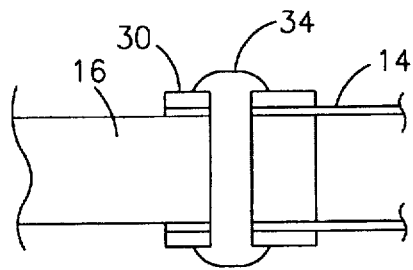

FIG. 2B shows a flexure mounting apparatus which incorporates a rivet 34. This configuration is in accordance with previously incorporated U.S. Pat. No. 4,783,710, and shows that the flexure 14 is fabricated with a mounting plate 30 which is relatively much thicker than the material of the flexure 14. As envisioned in the incorporated reference, a pair of flexures 14 is positioned on either side of the actuator head mounting arm 16. A rivet 34 is then inserted through an opening in each of the mounting plates 30 and a corresponding hole in the actuator head mounting arm 16. The rivet 34 is then compressed to cold flow and attach the flexures 14 to the actuator mounting arm 16. While this type of flexure mounting apparatus has certain advantages over the configuration of FIG. 2A, the ends of the rivets 34 still extend above and below the mounting plates 30, preventing close spacing of adjacent discs. Furthermore, to prevent shifting of the flexures 14 relative to the head mounting arms 16 due to the shocks applied during actuator contact with limit stops, the holes through the mounting plates 30 and the actuator head mounting arms 16 were preferably featured so that the rivet, upon cold-flowing under pressure, would lose its cylindrical symmetry and thus prevent rotation of the attached components. Such featuring of the mounting plates 30 and the head mounting arms 16 adds cost and complexity to the disc drive.

Figure 2C:
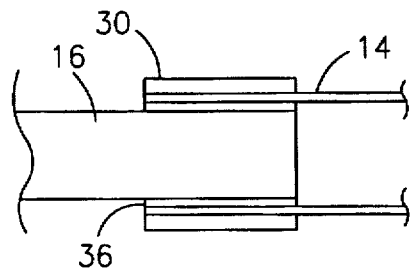

FIG. 2C shows a third prior art flexure mounting apparatus. In this configuration, the flexures 14 are still welded to mounting plates 30, but the mounting plates 30 are simple flat pieces, and the flexure/mounting plate subassemblies 14/30 are attached to the actuator head mounting arm 16 with an adhesive 36. This configuration greatly simplifies the flexure 14 and actuator head mounting arm 16, but tacitly implies the use of precision fixturing for aligning the flexure 14 with the actuator head mounting arm 16 and maintaining this alignment while the adhesive dries. Furthermore, the use of adhesives in high volume manufacturing environments is problematic, since it is common for the adhesives to flow beyond the intended location, contaminating not only the finished components but the assembly fixtures as well, requiring repeated cleaning of the fixtures and adding cost to the disc drive. Furthermore, since the flexures 14 and mounting plates 30 are typically made of stainless steel, while the actuator head mounting arms 16 are magnesium, these components expand and contract at different rates while the disc drive experiences temperature changes within a specified temperature range. Since the overlapping area between these two different materials is rather large, large stresses are induced in the flexure 14 and/or the actuator head mounting arm 16 during such thermal excursions, potentially causing unacceptable misalignment of these components and leading to the possibility of failed adhesive bond. For these reasons, adhesive bonding of the flexure to the actuator head mounting arm has never achieved widely accepted use in the industry.

Figure 2D:
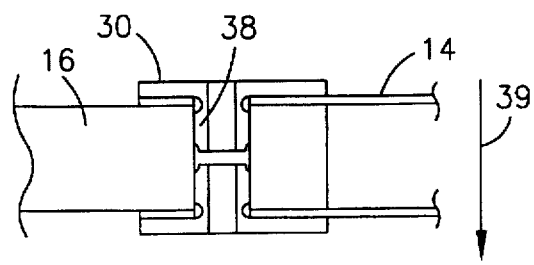

An examination of FIG. 2D shows a swaging flexure mounting scheme, the most commonly used current method for attaching flexures 14 to the actuator head mounting arm 16. As in the three previously described methods, this configuration requires that the flexure 14 be first welded to a rigid mounting plate 30. The apparatus shown in the figure includes a swaging boss 38 which is an integral part of the mounting plate 30. Including the swaging boss 38, and ensuring the necessary flatness of the mounting plate, requires that this part be precision machined, increasing the cost of the disc drive. To assemble the flexure mounting apparatus of FIG. 2D, a pair of flexure/mounting plate assemblies 14/30 are placed on opposite sides of the actuator head mounting arm 16 with the swaging bosses 38 of each extending into an appropriately sized hole in the actuator head mounting arm 16. A swaging tool is then passed through an opening in the center of the swaging bosses 38, plastically deforming the bosses 38 and expanding them into contact with the inner surface of the hole in the actuator head mounting arm 16. The swaging operation can be used to attach not only the two flexure/mounting plate assemblies 14/30 shown in the figure in a single operation, but also all flexure/mounting plate assemblies 14/30 in a vertically aligned array mounted to a plurality of actuator head mounting arms 16.

The swage attachment apparatus of FIG. 2D does, however, have certain disadvantages of its own. For instance, if the swaging operation is accomplished by passing the swaging tool through the bosses 38 in the direction of arrow 39 in the figure, the boss 38 on the upper mounting plate 30 is subjected to tensile or stretching stress, while the boss 38 on the lower mounting plate 30 is subjected to compressive stress. This difference in applied stress results in significant differences in the amount of attachment force applied by the upper and lower bosses against the hole in the actuator head mounting arm 16. In fact, recent test results have shown that the tensile stress on the upper boss can result in residual stresses which tend to lift the mounting plate 30 away from the surface of the actuator head mounting arm 16, thus lifting the base of the upper flexure 14 above its intended vertical position. This, in turn, leads to significant differences in the force applied to the slider at the distal end of the flexure and accompanying differences in the flying heights of heads on the upper and lower surfaces of the discs. Furthermore, having two swaging bosses 38 engaged in the same hole in the lo actuator head mounting arm 16 necessitates that the actuator head mounting arm 16 be of sufficient thickness to accommodate both bosses 38, limiting the closeness of adjacent disc surfaces, and thus overall disc drive capacity.

Previously incorporated U.S. Pat. No. 5,262,911 overcomes these limitations by providing longitudinally displaced swaging bosses for up and down flexure assemblies, with swaging accomplished by passing one swaging tool downward through one set of bosses and a second swaging tool upward through the second set of swaging bosses. This balances the forces exerted on the bosses and also allows a thinner actuator head mounting arm, since the arm only needs to accommodate the Z-height of a single boss at any one location. However, the flexure mounting apparatus of U.S. Pat. No. 5,262,911 requires that the mounting plate be substantially twice as long, adding to the mass at the distal end of the actuator head mounting arm, and thus serves to worsen one of the principal drawbacks of all of the prior art solutions of FIGS. 2A through 2D.

In summary, all of the prior art flexure mounting apparati of FIGS. 2A through 2D add significant, detrimental mass to the moving portion of the disc drive actuator. Furthermore, the inclusion of separately fabricated mounting plates requires the additional manufacturing step of welding the mounting plates to the flexure, adding cost and complexity to the disc drive manufacturing process.

The present invention minimizes the moving mass of the actuator, allows for a smaller vertical dimension at the flexure attachment, permitting either closer disc spacing or improved mechanical shock tolerance, while simplifying the fabrication of the flexure and the assembly of the disc drive, and improves the consistency of the load forces applied to the flexures.

Figure 3:
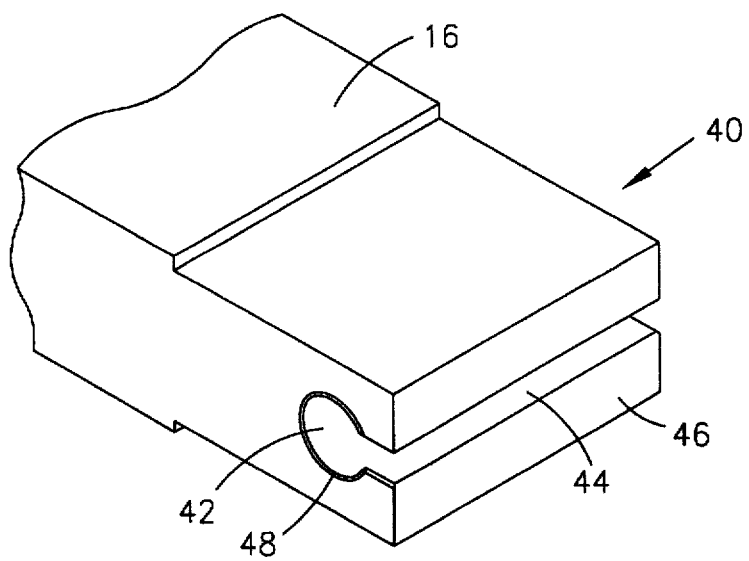
FIG. 3 is a perspective view of the distal end of an actuator head mounting arm which is modified to implement the present invention.

Turning now to FIG. 3, shown is a perspective view of a portion of the distal end 40 of an actuator head mounting arm 16 which has been fabricated in accordance with the present invention. As can be seen in the figure, the actuator head mounting arm 16 includes a transverse hole 42 closely adjacent the distal surface 46 of the actuator head mounting arm 16. The transverse hole 42 opens to this distal surface 46 through a transverse slot 44. It is also apparent from an examination of the figure that the ends of the transverse hole, as well as the lateral edges of the transverse slot, can be beveled (as shown at 48) to facilitate assembly of other components, as will be described in detail below. Such beveling, however, adds additional machining steps and costs to the disc drive and is not a part of the presently preferred embodiment of the invention.

Figure 4A:
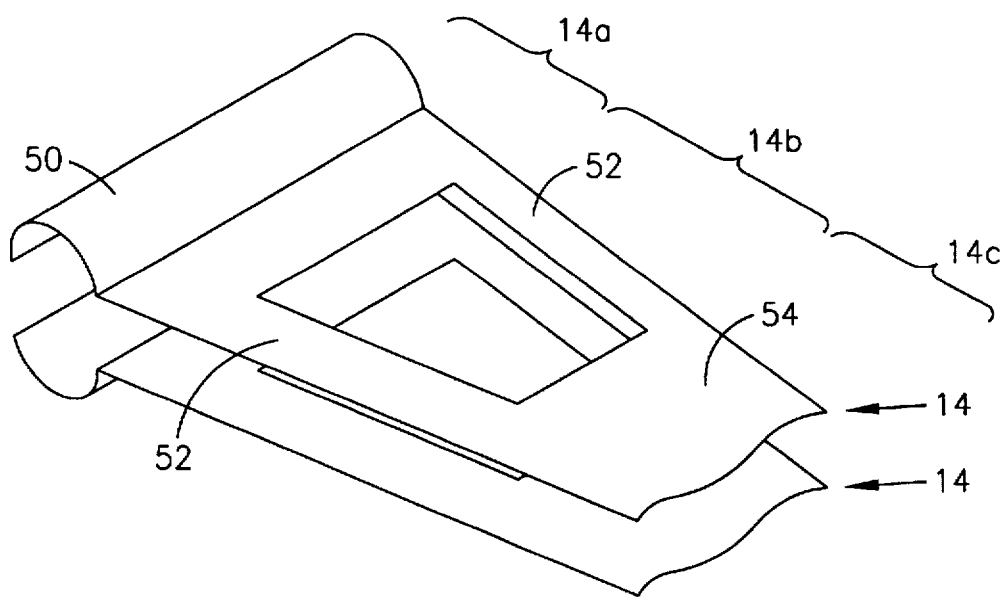
FIG. 4A is a perspective view of a pair of head suspension assemblies which are modified to implement the present invention.

FIG. 4A shows a portion of a pair of flexures 14 which have been fabricated in accordance with the present invention. Specifically, FIG. 4A shows the mounting portion 14$a$, spring portion 14$b$, consisting of a pair of spring beams 52, and part of the rigid beam portion 14$c$, including a planar member 54, previously described above. Since the present invention relates only to the mounting portion 14$a$ of the flexure assembly 14, details of the spring portion 14$b$ and rigid beam portion 14$c$—as well as the gimbal portion not shown in FIG. 4A—will not be further discussed herein. Details relating to these portions of the flexures 14 can be found in previously incorporated U.S. Pat. Nos. 5,428,490 and 5,331,489.

In FIG. 4A, it can be seen that the mounting portion 14$a$ of the flexures 14 does not include a mounting plate. Instead, the mounting portion 14$a$ is formed with a substantially semi-cylindrical transverse channel 50. As is apparent from the figure, the direction in which the transverse channel 50 extends from the plane of the flexure material is opposing for the two flexures 14 shown. The present invention envisions that a pair of flexures 14 will be supported by each actuator head mounting arm (16 in FIGS. 1 and 3) that lies between adjacent discs. That is, the upper flexure 14 in FIG. 4A would cooperate with the lower surface of a disc located above the flexures in the figure, while the lower flexure 14 would support a head assembly cooperating with the upper surface of a disc located below the flexures in the figure. When the pair of flexures thus formed are placed into back-to-back relationship, as shown, the opposing transverse channels 50 act to form a substantially cylindrical transverse opening. The manner in which this combination of features interacts to mount the flexures to the actuator head mounting arm will be discussed below.

Figure 4B:
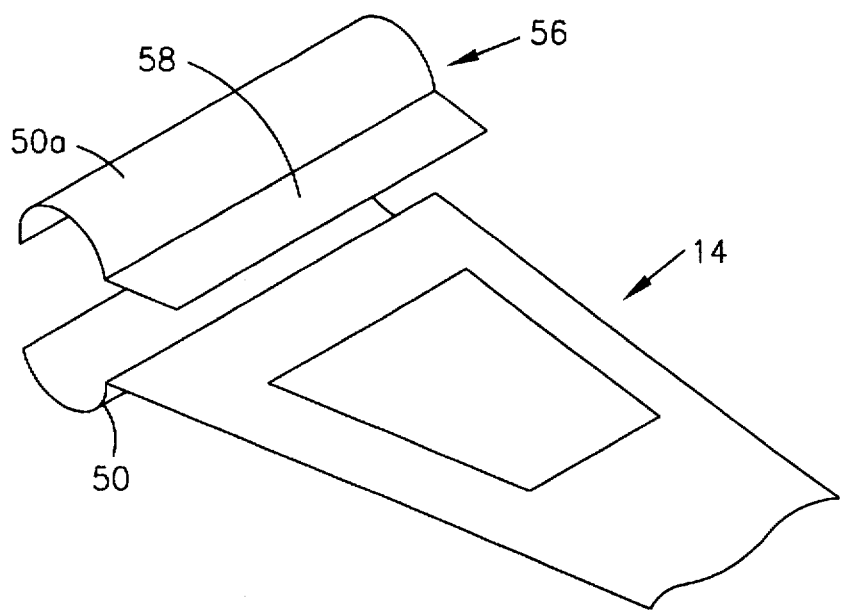
FIG. 4B is a perspective view including a dummy channel blank which is used to implement one aspect of the present invention.

It is well known in the industry to provide a single flexure/head assembly on a single actuator head mounting arm to access the upper surface of the uppermost disc in the disc drive assembly, and to access the lower surface of the lowermost disc. FIG. 4B shows a combination of components made in accordance with the present invention for attaching a single flexure assembly to an actuator head mounting arm. Specifically, FIG. 4B shows a flexure 14, such as the lower flexure 14 of FIG. 4A. This flexure 14, it will be recalled, is for accessing the upper surface of a disc located below the flexure 14, such as the top surface of the uppermost disc in a disc drive. Since there would be no flexure or head above the flexure 14 in FIG. 4B, a dummy channel blank 56 is provided by the present invention. This dummy channel blank 56 also includes a substantially semi-cylindrical transverse channel 50$a$, similar to the transverse channels 50 formed in the mounting portion (14$a$ in FIG. 4A) of the flexures 14, and a distally extending leaf portion 58. The dummy channel blank 56 cooperates with a flexure 14 for mounting to the actuator head mounting arm in a manner to be discussed below. It will be apparent to one of skill in the art that a similar, complementary arrangement of flexure 14 and dummy channel blank 56 would be utilized to mount the lowermost flexure in relationship to the lower surface of the lowermost disc in the disc drive assembly.

Figure 5:
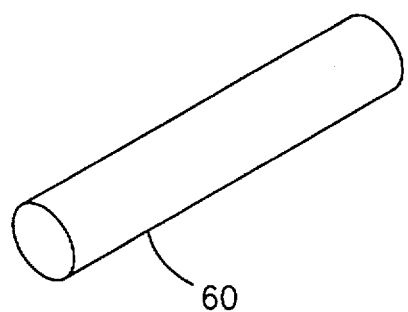
FIG. 5 is a perspective view of a pin member which is a major component of the present invention.

The final major component of the present invention is illustrated in FIG. 5. FIG. 5 shows a pin 60. The presently preferred embodiment of the invention envisions this pin 60 to be in the form of a cylindrical solid fabricated from fully annealed aluminum. This material allows cold-forming of the ends of the pin 60, as will be explained in detail below. Alternatively, the pin 60 could be in the form of a hollow tube. In a presently envisioned alternative embodiment, the pin 60 is formed of annealed 304 stainless steel hypodermic syringe stock with a 0.010 inch outer diameter and a 0.006 inch inner diameter. Suitable pin material is available from Superior Tube Company of Collegeville, Pa. The manner in which the pin 60 cooperates with the channels 50, 50$a$ of the flexures 14 and dummy channel blanks 56 and the transverse hole 42 and transverse slot 44 to mount the flexures to the actuator head mounting arms 16 will now be discussed.

Figure 6:
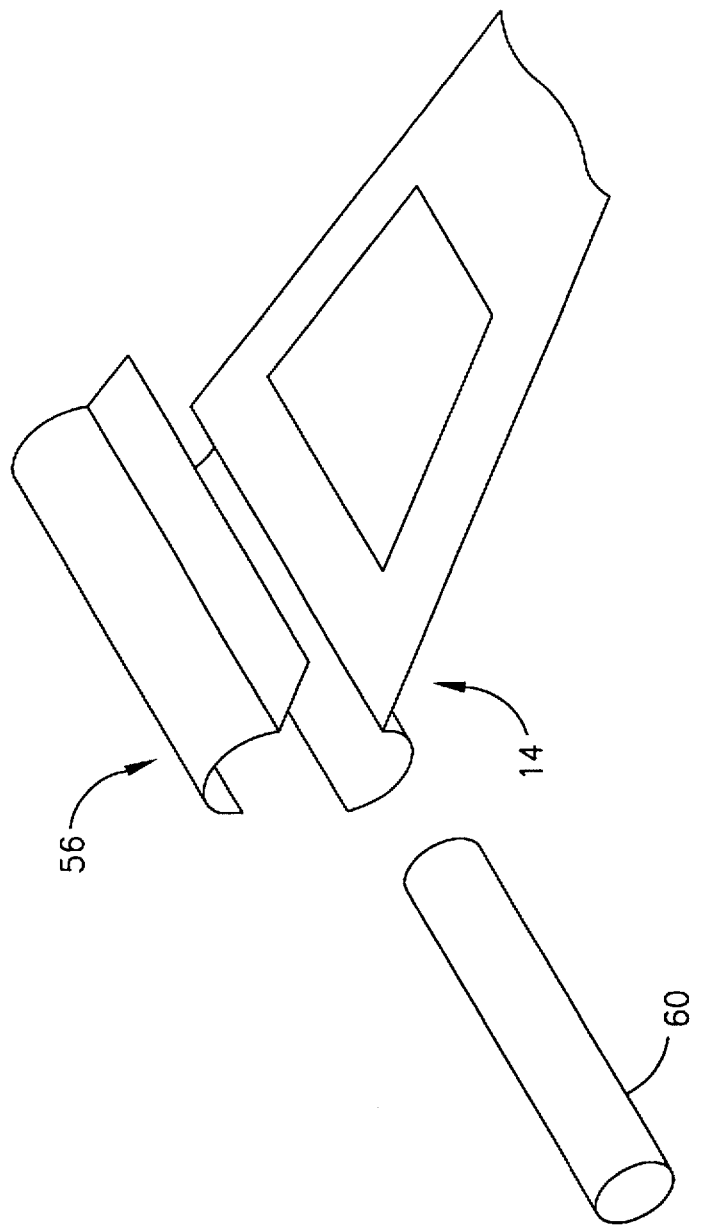
FIG. 6 is an exploded perspective view of components comprising the present invention showing the relationship of the invention components.

Turning to FIG. 6, shown is a pin 60, a flexure 14 and a dummy channel blank 56. This particular combination of components would be suitable for mounting the uppermost flexure in the disc drive, i.e., that flexure which supports the head which is used to access the upper surface of the uppermost disc in the disc drive. It will be apparent to those of skill in the art that a combination of pin 60 and two flexures 14, as shown in FIG. 4A, would serve to mount paired heads between adjacent discs, and that a similar configuration of a single flexure 14 and a channel dummy blank 56 would be used to mount the lowermost flexure in the disc drive. To assemble the components into their mounting configuration, the flexure 14 and dummy channel blank 56 are arranged as shown in FIG. 6 and then brought into back-to-back contact, forming a substantially cylindrical transverse opening between the transverse channels 50, 50$a$. The pin 60 is then inserted into the cylindrical transverse opening thus formed, and this combination of components is then inserted laterally into the transverse hole 42 in distal end of the actuator head mounting arm 16, with the flexure mounting portion (14$a$ in FIG. 4A) and the distally extending leaf portion 58 of the dummy channel blank 56 extending distally through the transverse slot 44 in the actuator head mounting arm 16.

Figure 7A:
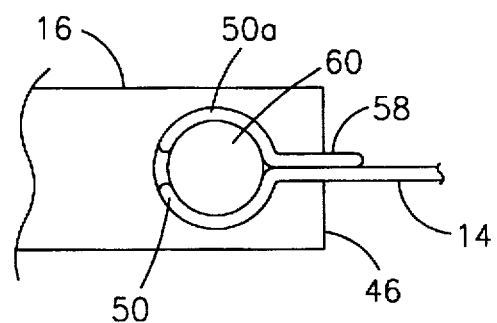
FIGS. 7A and 7B are side elevation sectional views showing the relationship of the components of FIGS. 4A, 4B and 5 as assembled to the actuator head mounting arm of FIG. 3.

The relationship between the assembled components is shown in FIG. 7A, which is a simplified sectional elevation view. FIG. 7A shows that the pin 60 and channels 50, 50$a$ of the flexure 14 and the dummy channel blank 56, respectively, substantially fill the transverse hole 42, and that the flexure mounting portion and the leaf portion 58 of the dummy channel blank 56 extend through and substantially fill the transverse slot 44, and project beyond the distal surface 46 of the actuator head mounting arm 16.

Figure 7B:
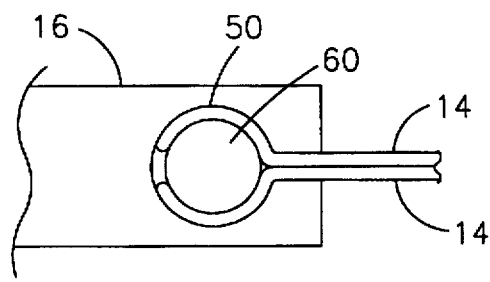

Similarly, FIG. 7B shows the assembled relationship between a pair of flexures 14 arranged in back-to-back relationship. Once again, the pin 60 and the channels 50 of the flexures 14 substantially fill the transverse hole 42 in the actuator head mounting arm 16, with the flexures 14 extending distally through the transverse slot 44 and beyond the distal surface 46 of the actuator head mounting arm 16.

Several possible schemes for assuring that the assembled components are retained in their desired relationship are within the scope of the present invention. For instance, if the combined outer diameter of the pin/channels 60/50 is slightly larger than the nominal diameter of the transverse hole 42, the resultant assembly will be held together by interference fit. Thus, if the pin 60 has an outer diameter of 0.010 inches and the material of the flexures 14 is 0.0025 inches, the combination of pin 60 and paired flexure channels 50 would have a diameter of 0.015 inches, and a transverse hole having a nominal diameter of 0.014 inches would result in 0.001 inch interference when the components are assembled. Such an interference fit could possibly result in a disc drive which would be capable of withstanding specified mechanical shocks without any shifting of the relationship of the components. However, to ensure that the established assembly relationship is maintained, additional assembly operations are anticipated by the preferred embodiment of the invention.

Specifically, it is envisioned that, after the pin 60 and flexure channels 50—or pin 60, flexure channel 50 and channel 50a in a dummy channel blank 56—are assembled in the transverse hole 42 in the actuator head mounting arm 16, the ends of the pin 60 will be cold-formed to prevent any component shifting. The specific operation presently envisioned to implement the preferred embodiment is called "cold-heading", and consists of laterally compressing the ends of the pin 60 in precision dies to form a head on the pin which has an outer diameter large enough to cover the lateral edges of the flexures (or single flexure and dummy channel blank), thus locking them in place.

In the presently preferred embodiment, it is contemplated that the width of the flexure in the area of the transverse channels would be nominally 0.004 inches wider than the nominal width of the actuator head mounting arm. With currently attainable tolerance ranges in the manufacture of both the chemically etched flexures and the machined actuator head mounting arm, this would result in a protrusion of the flexures beyond each side of the actuator head mounting arms of from 0.000 to 0.004 inches.

A basic rule of cold-heading operations is that the stroke of the heading tool must be long enough to fill the tool cavity with the material being headed, thereby forming the head. Therefore, a relatively long Stroke is needed. To form a head with a truncated conical shape, with the sides of the cone at a 45° angle, and the top of the cone truncated to the original pin diameter, the length of the tool stroke is determined by the following relationship:

$$S=H+(2H^2/D)+(2H^3/D^2)$$

where

S=the tool stroke,

H=the head height, and

D=the pin diameter.

The following table illustrates the tool stroke required for various combinations of pin diameter and finished head height. The dimensions are in mils, where 1 mil=0.001 inch.

Heading Tool Stroke Required to Form Truncated Conical Head with 45° Sides and Head Diameter at Top of Head Equal to Pin Diameter

| | (Dimensions in Mils) | | | | | |
|---|---|---|---|---|---|---|
| H\D | 5 | 6 | 7 | 8 | 9 | 10 |
| 5 | 25 | 20 | 17 | 16 | 14 | 13 |
| 6 | 38 | 30 | 25 | 22 | 19 | 18 |
| 7 | 54 | 42 | 35 | 30 | 28 | 24 |
| 8 | 75 | 58 | 47 | 40 | 35 | 31 |
| 9 | 100 | 77 | 62 | 52 | 45 | 40 |
| 10 | 130 | 99 | 79 | 66 | 57 | 50 |
| 11 | 166 | 125 | 100 | 83 | 71 | 62 |
| 12 | 208 | 156 | 124 | 102 | 87 | 75 |
| 13 | 256 | 191 | 151 | 124 | 105 | 91 |
| 14 | 312 | 232 | 182 | 149 | 125 | 108 |
| 15 | 375 | 278 | 217 | 177 | 148 | 128 |

An important parameter to be considered in cold-heading operations is the unsupported free pin length (F). The free pin length is equal to the tool stroke plus the head height (F=S+H). From the table above, it can be calculated that the combinations of head height H and pin diameter D encompasses a range of F/D from 1.8 to 78. A ratio of F/D greater than 10 is subject to elastic buckling before compressive yielding occurs (Higdon, *Mechanics of Materials*, Wiley, 1976, pg. 523). Therefore, the combinations including smaller pin diameters and taller head heights are impractical. Practical experience furthermore dictates a maximum F/D ratio of 3.0, otherwise excessive work-hardening of the material occurs with subsequent cracking of the edges of the head (Avalone, *Marks' Standard Handbook for Mechanical Engineers*, McGraw-Hill, pg. 13–21.) A 10 mil diameter pin formed to produce a head 6 mils high falls within this practical limit with a F/D ratio of 2.4, and thus provides a workable combination, compatible with other limitations imposed by the disc drive design.

Figure 8A:
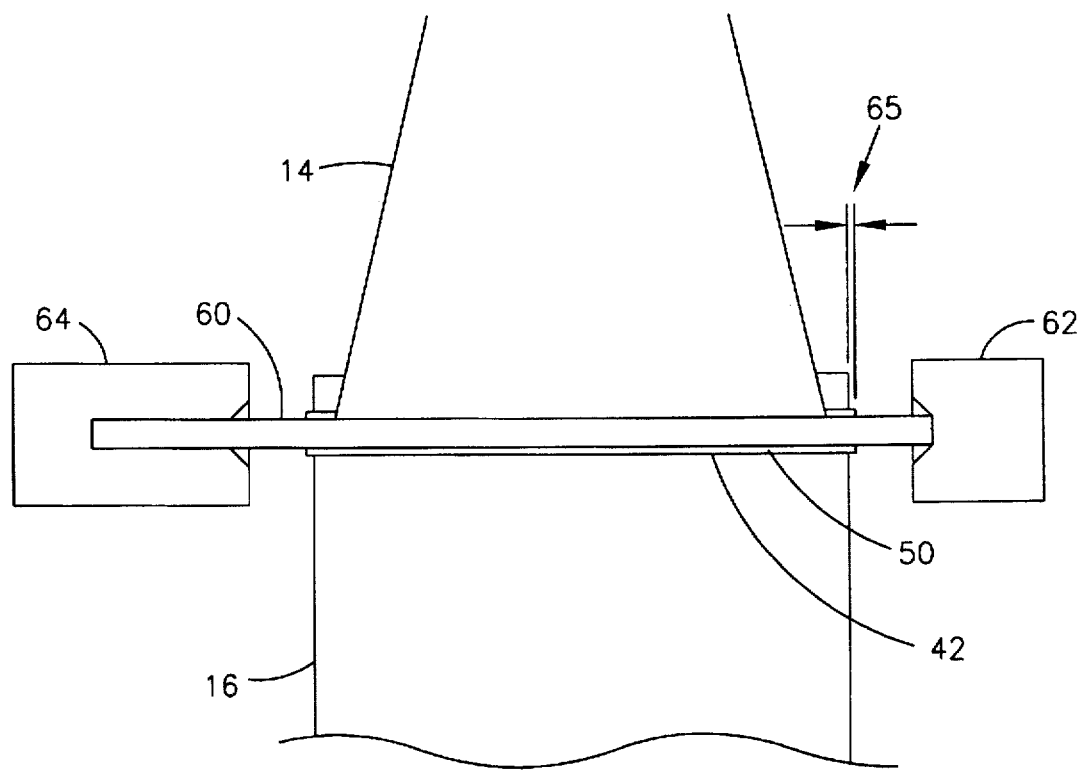
FIGS. 8A, 8B and 8C are plan views showing the flexure mounting apparatus of the present invention, along with a simplified representation of an assembly tool used to implement the present invention.
Figure 8B:
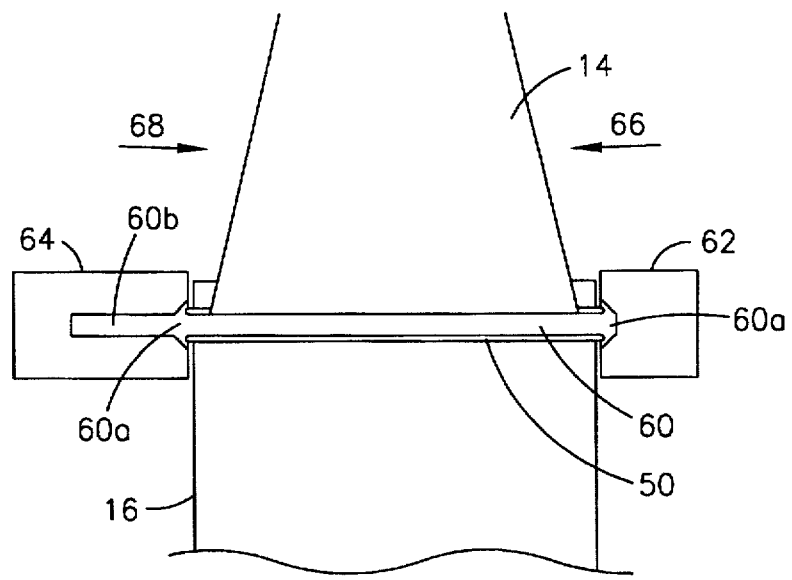

A simplified diagrammatic drawing of an assembly tool which would implement this forming of the ends of the pin 60 is shown in FIGS. 8A and 8B.

FIG. 8A shows a plan sectioned view of the components of the flexure mounting apparatus of the present invention as they would be after the flexure channels 50 and the pin 60 have been inserted into the transverse hole 42 in the actuator head mounting arm 16. The figure represents a sectional view taken through the central axis of the transverse opening 42, and shows the pin 60 extending laterally beyond the lateral extent of the flexure 14 and the actuator head mounting arm 16. A first tooling die 62 is shown engaging the right end of the pin 60, and a second tooling die 64 is shown engaging the left end of the pin 60. The figure shows that the tooling dies 62, 64 each include a central hole which cooperates with the outer diameter of the pin 60 and a conical cavity. It can also be seen in the figure that the lateral edges of the flexures 14 in the area of the transverse channels extend beyond the lateral extent of the actuator head mounting arm 16 by a nominal 0.002 inch, as noted at 65.

FIG. 8B shows a view similar to that of FIG. 8A after the tooling dies 62, 64 have been compressed laterally in the directions of arrows 66 and 68, respectively. Compressing the tooling dies 62, 64 in the directions shown deforms the ends of the pin 60 forming heads 60a which engage the channels 50 of the flexures 14. This formation of the heads 60a of the pin 60 locks the flexure 14 to the actuator head mounting arm 16.

It can also be noted that the left tooling die 64 has a much deeper central recess than the right tooling die 62. This deeper central opening allows a longer length of the transverse pin 60 to extend laterally from the head mounting arm 16 after forming of the heads 60a on the pin 60. This longer extension of the transverse pin 60 forms a pin extension 60b which can be easily grasped to remove the pin 60 and thus facilitate disassembly, should such disassembly be necessary to replace a defective component.

Figure 8C:
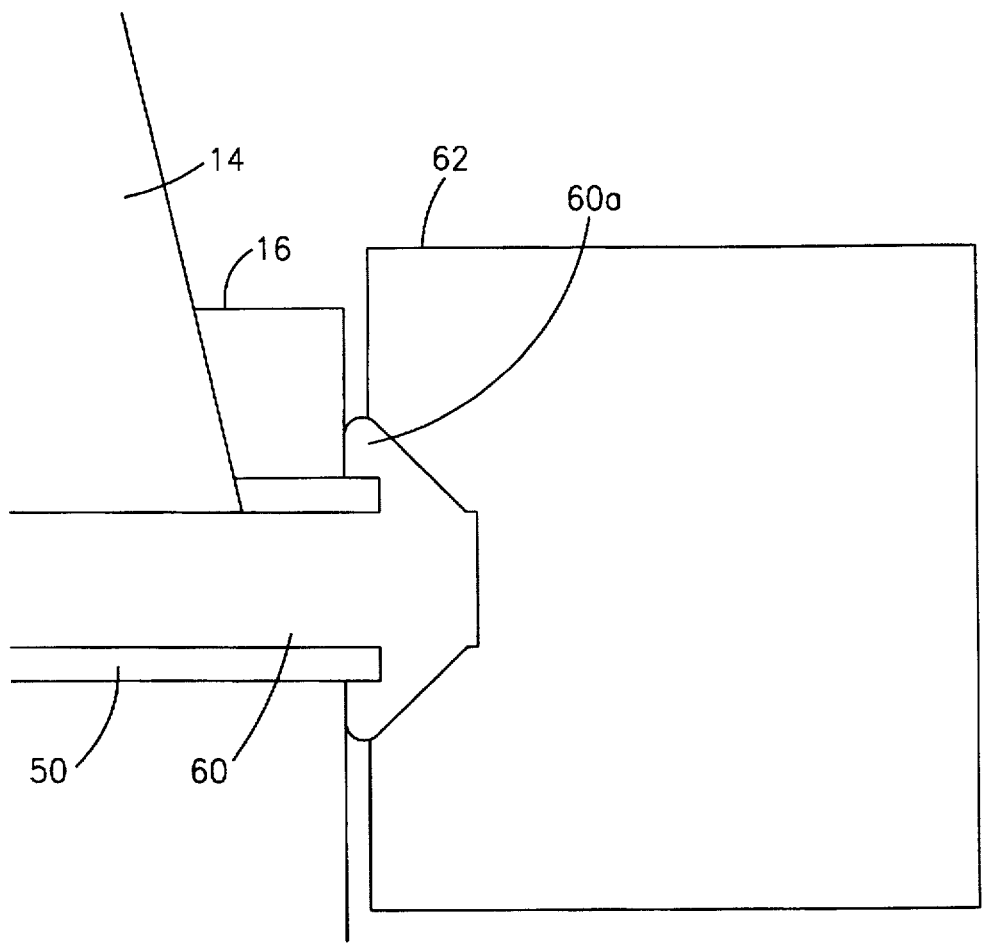

A detail view of the final assembled flexure/actuator head mounting arm assembly is shown in plan view in FIG. 8C. It is evident in FIG. 8C that the material of the transverse pin 60 has been cold-formed to provide a head 60a that overlaps and firmly engages the transverse edge of the channel 50 of the flexure 14 against the head mounting arm 16.

It will also be apparent to one of skill in the art from FIGS. 8A through 8C that all manufacturing stresses introduced during the described manufacturing steps are applied to the delicate head arm and flexure components in their strongest axis, i.e., transversely, and, therefore, are less likely to either damage the components during assembly or leave excessive residual stresses in the components after assembly.

A comparison of the flexure mounting apparatus of the present invention with a prior art flexure mounting apparatus will now be made. The prior art flexure mounting apparatus which will be used for comparison is of the type previously discussed in relationship to FIG. 2D, that is a back-to-back swage mount, which is commonly in current use in the industry. During this discussion, reference will be made to FIGS. 9A and 9B.

Figure 9A:
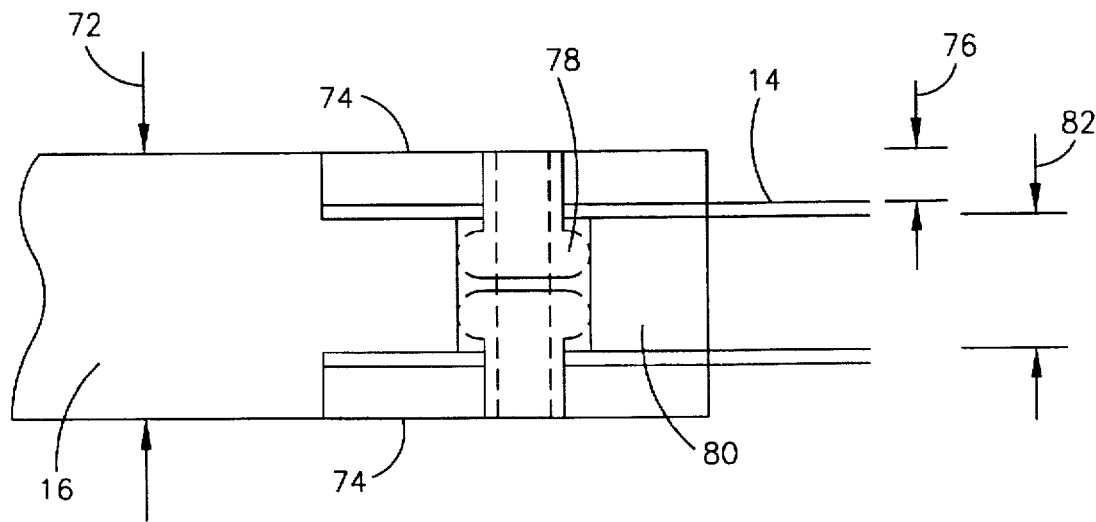
FIGS. 9A and 9B are side elevation views used in a comparison of a prior art flexure mounting apparatus to the present invention.

Turning now to FIG. 9A, shown is an elevation view of a prior art flexure mounting apparatus similar to that previously discussed with regard to FIG. 2D. In FIG. 9A, it can be seen that the actuator head mounting arm 16 has a first thickness, designated with the numerical reference 72, along the majority of its length. This thickness 72 in a typical current model disc drive is approximately 0.041 inches, which provides sufficient stiffness for the disc drive to sustain specified mechanical shocks without suffering contact between the flexure mounting apparatus and the discs. For purposes of this discussion, it will be assumed that the actuator head mounting arms 16 will retain this same thickness over the majority of its length in both the prior art and inventive embodiments, and that the differences in mass will occur only at the distal end of the actuator head mounting arm 16 in the region where the flexures are attached. In the prior art flexure mounting apparatus of FIG. 9A, the flexure assemblies 14 include mounting plates 74 which are approximately 0.200 inches square, and have a thickness 76 of 0.008 inches and incorporate a swage boss 78. The tip 80 is precision reamed to a bore diameter of 0.108 inches to accept the swage bosses 78. The tip 80 of the actuator head mounting arm 16 which abuts the mounting plates 74 has a thickness 82 of 0.020 inches. From these figures, it can be calculated that the volume of the arm tip 80 is 0.00062 in$^3$, and, with a density of 0.10 lbm/in$^3$, a mass of 0.000062 lbm or 28 mg. Similarly, it can be calculated that the mounting plate 74 has a volume of 0.000320 in$^3$, and, with a density of 0.29 lbm/in$^3$, a mass of 0.0000928 lbm or 42.1 mg. Compensating for the additional mass of the swage boss 78, and subtracting the material for the through hole in the swage boss 78, the actual mass of a typical mounting plate with swage boss has been found to be closer to 38 mg. Therefore, the combined mass of the arm tip 80 and a pair of mounting plates 74, disregarding the mass of the flexure material contiguous with the mounting plates, is 28.0+2(38) or 104.0 mg.

Figure 9B:
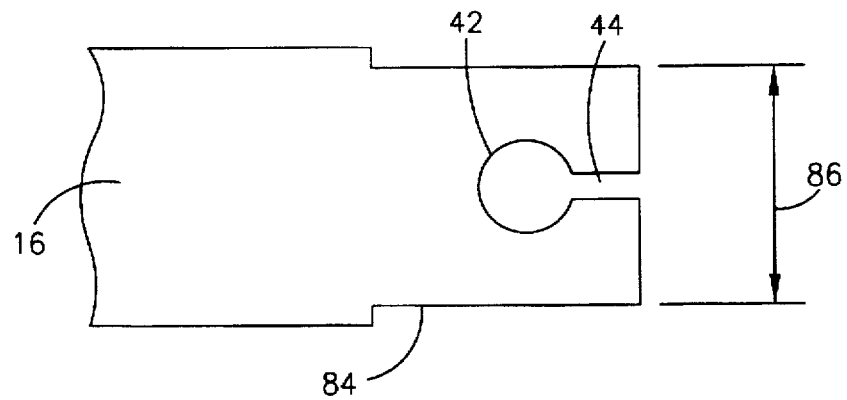

An examination of FIG. 9B, which shows the end of an actuator head mounting arm fabricated in accordance with the present invention, will allow a comparison of the masses of the prior art and the present invention. In FIG. 9B, the transverse hole 42 has a diameter of 0.015 inches (0.010 inch for the pin and 2×0.0025 inch for two flexure channels). It is estimated that providing 0.010 inch of material surrounding the transverse hole 42 will ensure that the material of the arm tip 84 will not relax and allow the flexure attachment to loosen after the pin is formed as explained above. This results in an arm tip 84 with a thickness 86 of 0.035 inches. Allowing for the volume of the transverse hole 42 and the transverse slot 44, the volume of the arm tip 84 in accordance with the present invention is 0.00135 in$^3$, and the mass of the arm tip 84 is 0.000135 lbm or 61.5 mg. The transverse pin used to mount the flexures in accordance with the present invention has 0.024 inches of free length at each end for cold heading, plus an extension at one end of 0.050 inches to allow for easy removal. Thus, the total pin length is 0.298 inches. The volume and mass of a solid aluminum pin of these dimensions are 0.0000234 in$^3$ and 0.0000023 lbm or 1.1 mg, respectively. Again disregarding the mass of the flexure material included in the region of the flexure attachment, the combined arm tip mass is 61.5 mg+1.1 mg or 62.6 mg. It is apparent from a comparison with the previous calculations that the flexure mounting apparatus of the present invention can conservatively be expected to save at least 41.4 mg per head mounting arm. Furthermore, it is apparent from the drawings that the amount of flexure material which extends over the arm tips in the configuration of the present invention is significantly less than the amount of similar material in all of the cited prior art flexure mounting systems. This reduction in flexure material at the head arm/flexure jointure would also contribute to a reduction in moving mass. The foregoing comparison is summarized in Table 1.

TABLE 1

| | HGA Mounting Mass in Milligrams | |
|---|---|---|
| Component | Baseplate Mounting | Transverse Pin Mounting |
| Upper Baseplate | 38.0 | |
| Lower Baseplate | 38.0 | |
| Transverse Pin | | 1.1 |
| Arm Tip Material | 28.0 | 61.5 |
| Total | 104.0 | 62.6 |

In a disc drive which includes ten head mounting arms, as is currently common in the industry, the overall mass reduction would thus be at least 414 mg. It has also been calculated that this order of mass reduction would reduce the access time of a disc drive that operated at an average access time of, for instance, 8.0 ms with the prior art swage flexure mount apparatus of FIG. 9A to an average access time of 7.72 ms with the flexure mounting apparatus of the present invention without any changes to the operating parameters of the voice coil actuator motor. In the highly competitive marketplace of the industry, this is a significant reduction.

In addition to the above noted reduction in average access time, the flexure mounting apparatus of the present invention also provides a significant advantage in the area of mechanical shock tolerance. Two characteristics typically limit the amount of mechanical shock which the disc drive can endure without experiencing contact between the head mounting arm and the disc surface, resulting in potentially fatal damage to the disc drive: 1) the spacing between the arm tip and the disc surface; and 2) the mass and flexibility of the arm.

Regarding clearance between the arm tip and the disc surface, using the dimensions noted above in regard to FIGS. 9A and 9B, and assuming 0.070 inch spacing between adjacent disc surfaces, the prior art flexure mounting apparatus of FIG. 9A provides arm tip to disc clearance of 0.0145 inches, while the transverse pin flexure mounting apparatus of the present invention, as illustrated in FIG. 9B, provides arm tip to disc clearance of 0.0175 inches. This represents a 20.7% improvement in arm tip clearance, which would allow the disc drive to experience significantly larger mechanical shocks without damage.

Alternatively, the reduction of overall arm tip height could allow the discs to be more closely spaced, resulting in either a smaller disc drive package or more discs in the same package with larger disc drive storage capacity.

As previously noted, the flexure mounting apparatus of the present invention significantly reduces the mass at the arm tip. Such a mass reduction, with all other elements of design remaining the same, results in less arm deflection per gravity of acceleration, again allowing the disc drive to withstand higher levels of mechanical shock without damage. As an example, a finite element analysis of the actuator head mounting arm and flexure/head assembly in an existing 2.5" disc drive subjected to a shock pulse with 300 g amplitude and 2 ms duration showed that the arm tip deflection per gravity of shock-induced acceleration was reduced by 6.5%. In another similar analysis conducted on a 3.5" disc drive, the arm tip deflection per gravity was reduced by 11.3%.

From the foregoing, it is apparent that the present invention can contribute to both an improvement in access speed in a disc drive and to an improvement in mechanical shock tolerance. Alternatively, if the mechanical shock tolerance of the disc drive is permitted to remain constant, the present invention provides the potential of either reducing the physical envelope of the disc drive or increasing disc drive capacity by allowing the inclusion of more discs within the same physical envelope.

As was previously mentioned hereinabove, it has been found that the currently typical practice of swage mounting flexures to actuator head mounting arms applies large forces in the weakest axis of the head mounting arm (Z-axis) and induces significant stresses and plastic deformations of the mounting plate and head mounting arm tip. As also noted above, this can lead to undesirable variations in the load force applied by the flexure to counterbalance the hydrodynamic lifting force of the slider. That is, even when extreme care is taken to ensure consistent spring rates in the spring portion of the flexure at the component level, once the flexures are swage mounted to the head mounting arms, slider preload values vary over an unacceptable range, especially when considering the differences between up and down head assemblies. Since the flexure mounting apparatus of the present invention applies force only across the width of the head mounting arm, a relatively strong direction, the present invention also contributes to improving the consistency of the preload force applied by the flexure to the slider, thus improving overall consistency and reliability of the disc drive.

FIGS. 10A through 10C, 11A and 11B, 12A through 12D and 13 show alternative embodiments of certain elements of the present invention which are considered to be within the scope of the present invention.

Figure 10A:
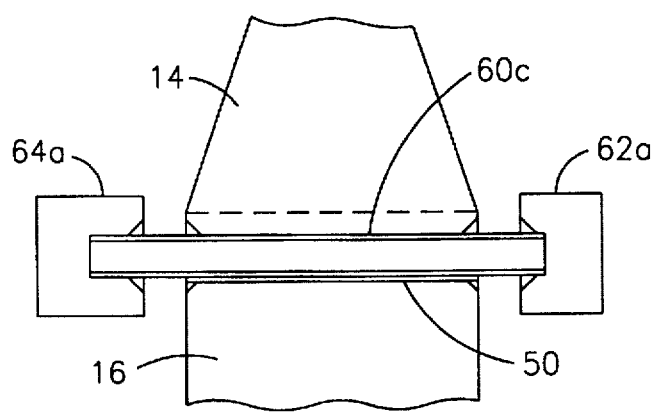
FIGS. 10A, 10B and 10C are plan sectional elevation views showing alternative embodiments of certain elements of the present invention.
Figure 10B:
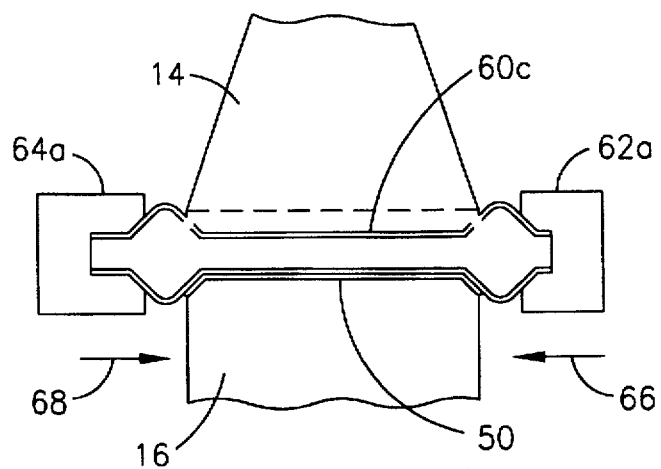
Figure 10C:
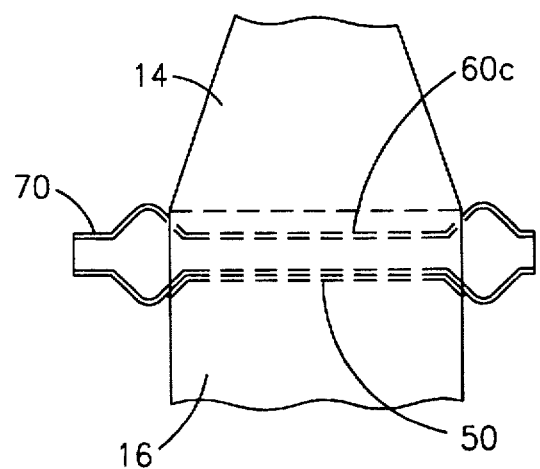

In particular, FIGS. 10A through 10C show views similar to those of FIGS. 8A through 8C, that is, plan sectional views taken along the central axis of the transverse hole in the head mounting arm 16. In the embodiment shown in the figures, the pin 60c is in the form of a hollow cylinder, such as the hypodermic needle stock previously described. Tooling dies 62a, 64a engage the ends of the pin 60c and each have a central opening sized to engage the outer diameter of the pin 60c. When the tooling dies 62a, 64a are compressed in the direction of arrows 66, 68, respectively, the pin is deformed producing bulges (not designated) which in turn deform the lateral edges of the flexure 14, locking the flexure 14 and pin 60c against the bevels (48 in FIG. 3) at the ends of the transverse opening and transverse slot (42 and 44, respectively, in FIG. 3). While this embodiment is capable of achieving the functional objects of the invention, it has been found that the use of a hollow pin 60c may well be economically unfeasible.

Figure 11A:
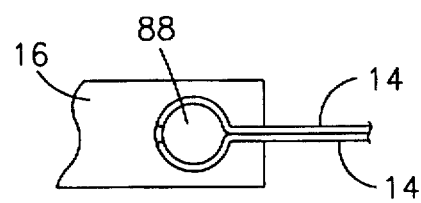
FIGS. 11A and 11B are simplified side and end sectional elevation views, respectively, showing alternative embodiments of certain elements of the present invention.
Figure 11B:
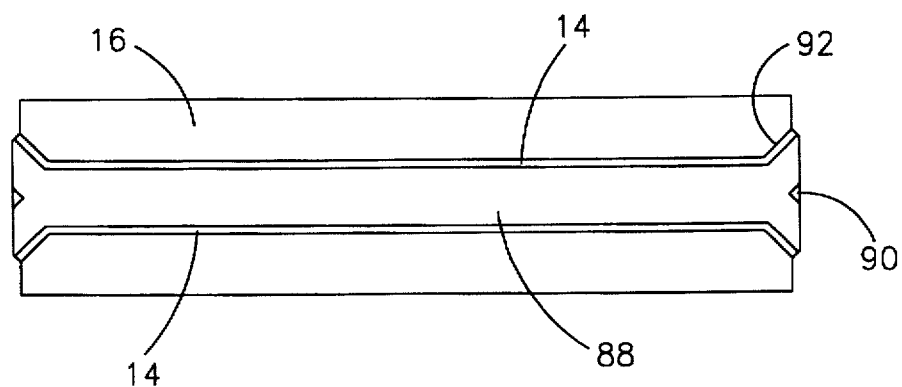

FIGS. 11A and 11B show side sectional elevation and end sectional elevation views, respectively, of a completely assembled flexure mounting apparatus incorporating another alternative embodiment. Specifically, the figures show a flexure mounting apparatus which includes a solid transverse pin 88, rather than the hollow tube transverse pin 60c previously described. The illustrated configuration still comprises a head mounting arm 16 which includes a transverse hole closely adjacent its distal end and a pair of flexures 14—or a single flexure and a dummy channel blank as described in relationship to FIG. 4B—between which the pin 88 is inserted. This combination of components is then inserted into the transverse hole in the actuator head mounting arm 16. To secure the flexures 14 and transverse pin 88 in their intended position, the ends of the transverse pin 88 are staked, as most clearly seen at 90 in FIG. 11B, spreading the pin material and the material at the lateral edges of the flexures 14 against the bevels 92 at the ends of the transverse hole. While this configuration provides a low cost pin and a simple assembly procedure, any necessary rework or replacement of the components would be more difficult than the combination of components and process described in relationship to FIGS. 8A through 8C above.

Figure 12A:
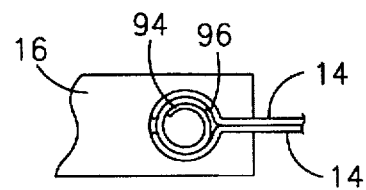
FIGS. 12A through 12D are simplified side elevation sectional views showing additional alternative embodiments of certain elements of the present invention.
Figure 12B:
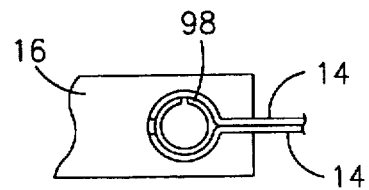

Turning to FIGS. 12A through 12D, shown are four additional variations on the present invention. FIGS. 12A and 12B show embodiments that differ from those previously described primarily in the type of transverse pin used to mount the flexures 14 on the actuator head mounting arm 16. In FIG. 12A, the transverse pin is shown to be a rolled pin 94. While this type of pin is operable and within the intended scope of the invention, fabrication of a rolled pin with an outer diameter in the 0.010 inch range could be problematic, and the locking force applied to the flexures 14 would not be evenly distributed radially, as can be seen by the gap 96 between the pin 94 and the flexure 14 at the point where the layers of the pin 94 overlap.

FIG. 12B shows a similar configuration to that of FIG. 12A, with the difference lying again in the type of transverse pin, in the case of the configuration of FIG. 12B a split pin 98. This configuration, while again operable and within the intended scope of the present invention, suffers from drawbacks similar to those set forth regarding the configuration of FIG. 12A.

Figure 12C:
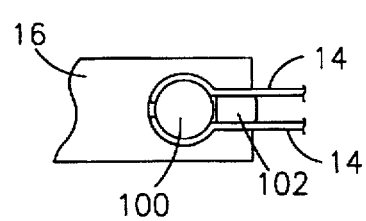
Figure 12D:
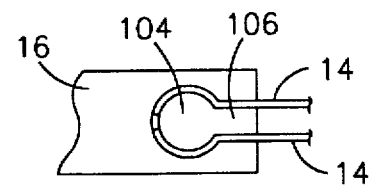

FIGS. 12C and 12D show alternative embodiments of the present invention for situations in which it would be desirable to separate the bases of the flexures 14. Such desirability would be dependent on the type of flexures being mounted, and thus not within the scope of the present invention. However, modification of the flexure mounting components to enable separation of the bases of the flexures 14 upon assembly is a variation intended to fall within the scope of the invention.

Turning now to FIG. 12C, shown is a combination of a solid transverse pin 100 and a separately fabricated flexure spacer element 102. The combination of FIG. 12C would work equally well with a hollow tube transverse pin, as previously described. Assembly of this combination, however, would require that the flexures 14, the transverse pin 100 and the flexure spacer element 102 all be assembled and held together while they are inserted into the transverse hole in the actuator head mounting arm 16. This could lead to difficulties in assembly.

The combination of components shown in FIG. 12D provides the same flexure base separation as that of FIG. 12C, but accomplishes this goal with the use of a specially formed transverse pin 104 which includes an integral flexure spacer flange 106. Pin stock of this cross-sectional shape could be formed by extrusion, thus simplifying assembly over the combination of components shown in FIG. 12C.

Figure 13:
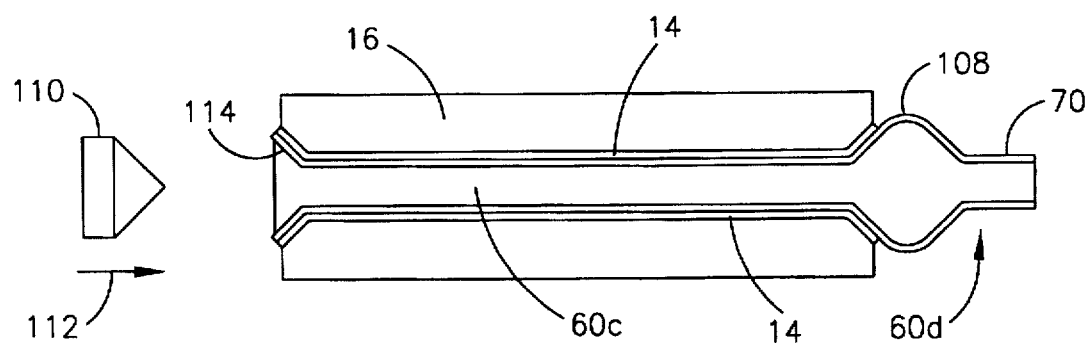
FIG. 13 is an end sectional elevation view showing another alternative embodiment of certain elements of the present invention.

Yet another possible modification of the components of the flexure mounting apparatus of the present invention is illustrated in FIG. 13, which is an end sectional elevation view taken through the central axis of the transverse hole and transverse pin 60c. In the figure, the right end, shown generally at 60d, of the pin 60c can be seen to be formed as previously discussed in relationship to FIGS. 10A through 10C above. That is, the right end 60d of the transverse pin 60c has been compressed using a tooling die to form an extension 70 used to grasp and remove the transverse pin 60c for any necessary rework. The compression also forms a bulge 108 which deforms and captures the flexures 14 against the bevel in the end of the transverse hole in the actuator head mounting arm 16.

At the left side of FIG. 13, it can be seen that the transverse pin 60c has been dimensioned to extend only slightly beyond the lateral extent of the head mounting arm 16. With such a pin configuration, it would be feasible to flare the left end of the transverse pin 60c using a conical jewelled tool 110 moved in the direction of arrow 112. This would result in a flaring of the transverse pin (shown at 114) and attendant flaring of the lateral edges of the flexures 14, securing the assembly.

From the foregoing discussion it is apparent that the present invention is well adapted to provide the features and satisfy the objects stated above, and that the invention also provides all of the advantages noted as well as those inherent therein. While a presently preferred embodiment and several modifications have been described herein, other modifications and changes may become apparent to one of skill in the art upon reading this disclosure. Therefore, the scope of the invention should be considered to be limited only by the following claims.

What is claimed:

1. A flexure mounting apparatus for a disc drive comprising:
    a head mounting arm, including a transverse hole closely adjacent the distal end of the head mounting arm and a transverse slot communicating between the transverse hole and the distal surface of the head mounting arm;
    a pair of flexures formed with substantially semi-cylindrical transverse channels at their proximal mounting ends; and
    a transverse pin;
    the flexures being placed into adjacent back-to-back relationship, whereby a substantially cylindrical transverse opening is formed by the transverse channels;
    the pin being inserted into the substantially cylindrical transverse opening formed by the transverse channels of the flexures; and
    the flexures, with the pin inserted in the substantially transverse opening formed by the transverse channels, being laterally inserted into the transverse hole in the distal end of the head mounting arm with the flexures extending distally through the transverse slot.

2. The flexure mounting apparatus as claimed in claim 1, wherein the flexures and transverse pin are held in the transverse hole by interference fit.

3. The flexure mounting apparatus as claimed in claim 1, wherein the transverse pin extends laterally beyond the lateral extreme of the head mounting arm and flexures to form pin extensions, the pin extensions being laterally compressed to deform the transverse pin and lock the transverse pin and flexures to the head mounting arm.

4. The flexure mounting apparatus as claimed in claim 1 wherein the transverse pin is formed as a hollow tube.

5. The flexure mounting apparatus as claimed in claim 1 wherein the transverse pin is formed of annealed 304 stainless steel hypodermic syringe stock.

6. The flexure mounting apparatus as claimed in claim 1 wherein the transverse pin is formed of annealed 304 stainless steel hypodermic syringe stock with a 0.010 inch outer diameter and a 0.006 inch inner diameter.

7. The flexure mounting apparatus as claimed in claim 1 wherein the transverse pin is formed as a cylindrical solid.

8. The flexure mounting apparatus as claimed in claim 1 wherein the transverse pin is formed as a cylindrical solid and staked at its ends to lock the transverse pin and flexures in the transverse hole in the distal end of the head mounting arm.

9. The flexure mounting apparatus as claimed in claim 1 wherein the transverse pin is formed as a rolled pin.

10. The flexure mounting apparatus as claimed in claim 1 wherein the transverse pin is formed as a split pin.

11. The flexure mounting apparatus as claimed in claim 1 wherein a flexure spacer element is interposed in the transverse slot between the flexures.

12. The flexure mounting apparatus as claimed in claim 1 wherein the transverse pin is formed with an integral flexure spacer element interposed in the transverse slot 55 between the flexures.

13. A flexure mounting apparatus for mounting a single flexure in a disc drive 58 comprising:
    a head mounting arm, including a transverse hole closely adjacent the distal end of the head mounting arm and a transverse slot communicating between the transverse hole and the distal surface of the head mounting arm;
    a flexure formed with a substantially semi-cylindrical transverse channel at its proximal mounting end;
    a dummy channel blank formed with a substantially semi-cylindrical transverse channel at its proximal mounting end and a distally extending leaf portion; and
    a transverse pin;
    the flexure and dummy channel blank being placed into adjacent back-to-back relationship, whereby a substantially cylindrical transverse opening is formed by the transverse channels of the flexure and dummy channel blank;
    the pin being inserted into the substantially cylindrical transverse opening formed by the transverse channels of the flexure and dummy channel blank; and
    the flexure and dummy channel blank, with the pin inserted in the substantially transverse opening formed by the transverse channels, being laterally inserted into the transverse hole in the distal end of the head mounting arm with the flexure and leaf portion of the dummy channel blank extending distally through the transverse slot.

14. The flexure mounting apparatus as claimed in claim 13, wherein the flexure, dummy channel blank and transverse pin are held in the transverse hole by interference fit.

15. The flexure mounting apparatus as claimed in claim 13, wherein the transverse pin extends laterally beyond the lateral extreme of the head mounting arm, flexure and dummy channel blank to form pin extensions, the pin extensions being laterally compressed to deform the transverse pin and lock the transverse pin, flexure and dummy channel blank to the head mounting arm.

16. The flexure mounting apparatus as claimed in claim 13 wherein the transverse pin is formed as a hollow tube.

17. The flexure mounting apparatus as claimed in claim 13 wherein the transverse pin is formed of annealed 304 stainless steel hypodermic syringe stock.

18. The flexure mounting apparatus as claimed in claim 13 wherein the transverse pin is formed of annealed 304 stainless steel hypodermic syringe stock with a 0.010 inch outer diameter and a 0.006 inch inner diameter.

19. The flexure mounting apparatus as claimed in claim 13 wherein the transverse pin is formed as a cylindrical solid.

20. The flexure mounting apparatus as claimed in claim 13 wherein the transverse pin is formed as a cylindrical solid and staked at its ends to lock the transverse pin, flexure and dummy channel blank in the transverse hole in the distal end of the head mounting arm.

21. The flexure mounting apparatus as claimed in claim 13 wherein the transverse pin is formed as a rolled pin.

22. The flexure mounting apparatus as claimed in claim 13 wherein the transverse pin is formed as a split pin.

23. The flexure mounting apparatus as claimed in claim 13 wherein a flexure spacer element is interposed in the transverse slot between the flexure and the leaf portion of the dummy channel blank.

24. The flexure mounting apparatus as claimed in claim 13 wherein the transverse pin is formed with an integral flexure spacer element interposed in the transverse slot between the flexure and the leaf portion of the dummy channel blank.

* * * * *